(No Model.) 2 Sheets—Sheet 1.
J. O. ANDERSON.
ORE SEPARATOR AND CONCENTRATOR.
No. 577,705. Patented Feb. 23, 1897.
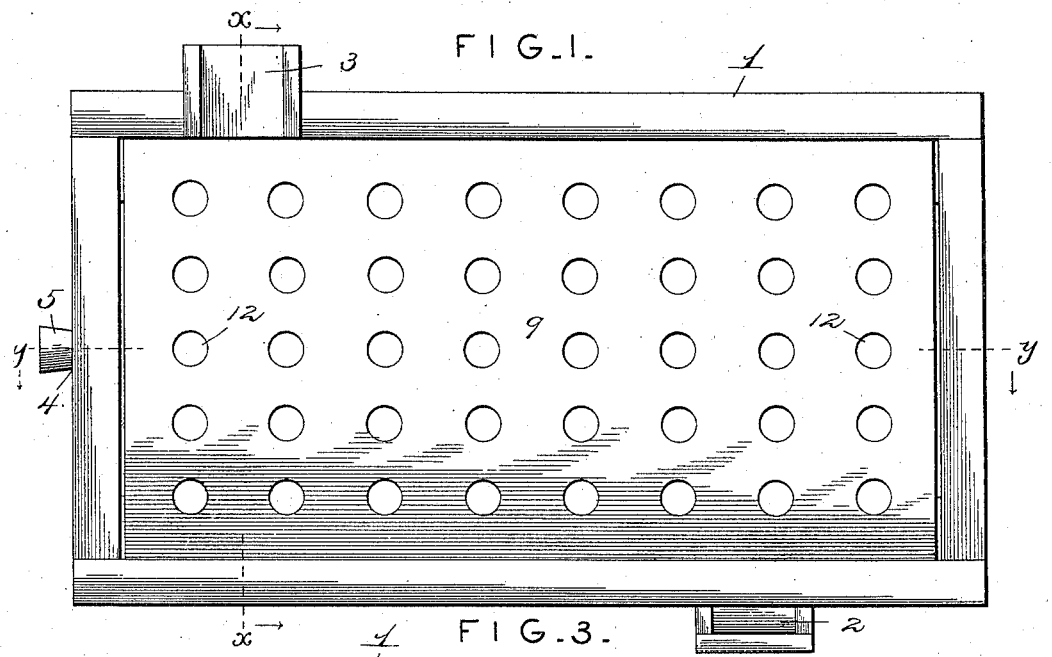
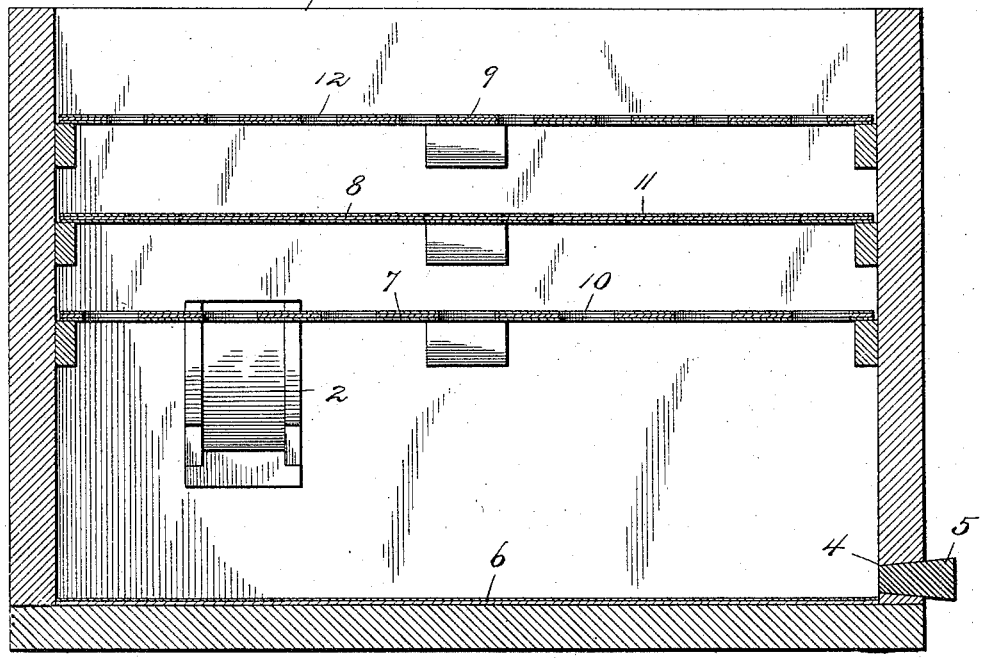
Witnesses
Harry L. Ames.
U. B. Hillyard.
Inventor
John O. Anderson.
By his Attorneys,
C. A. Snow & Co.

(No Model.) 2 Sheets—Sheet 2.
J. O. ANDERSON.
ORE SEPARATOR AND CONCENTRATOR.
No. 577,705. Patented Feb. 23, 1897.
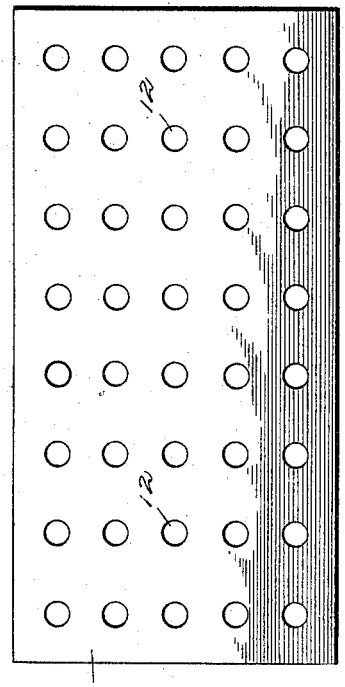
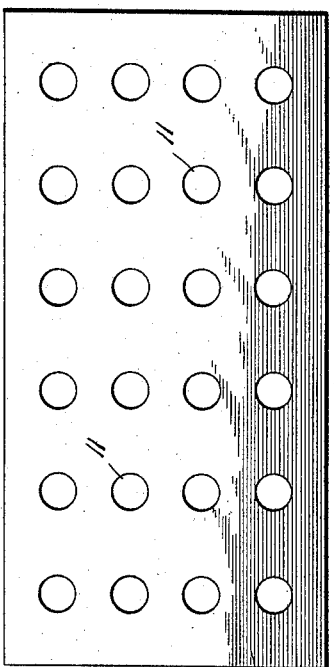
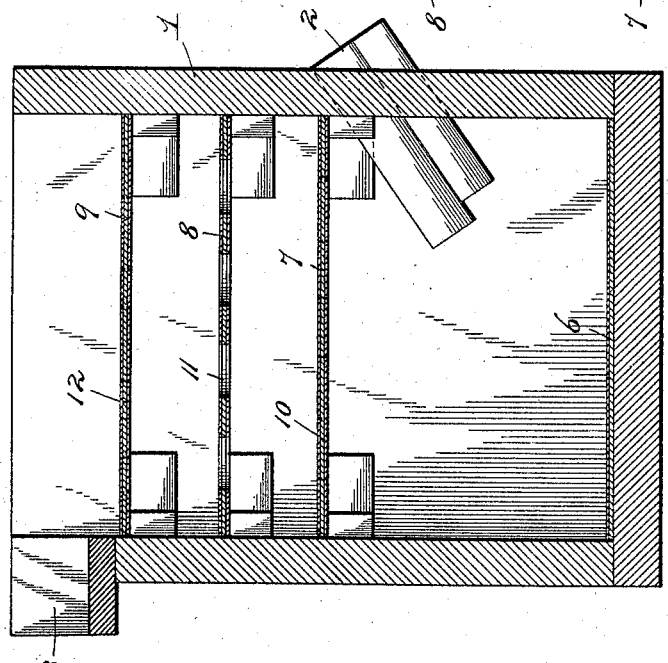
Witnesses
Harry L. Amer.
V. B. Hillyard.
Inventor
John O. Anderson.
By his Attorneys,
C. A. Snow & Co.

UNITED STATES PATENT OFFICE.

JOHN O. ANDERSON, OF LEAD, SOUTH DAKOTA.

ORE SEPARATOR AND CONCENTRATOR.

SPECIFICATION forming part of Letters Patent No. 577,705, dated February 23, 1897.

Application filed April 8, 1896. Serial No. 586,714. (No model.)

*To all whom it may concern:*

Be it known that I, JOHN O. ANDERSON, a citizen of the United States, residing at Lead, in the county of Lawrence and State of South Dakota, have invented a new and useful Ore Separator and Concentrator, of which the following is a specification.

This invention aims to remove all particles of precious metals from the water of quartz and other mills, placer-sluices, and ore-treating machinery. These values usually float, and advantage is taken of this fact to feed the ore-bearing medium into the lower portion of a trap or box and have it rise therein and pass off at a higher level, a series or bank of reticulated dressed plates being located at different elevations in the box to obstruct and cause the medium to be deflected in its course so as to insure the engagement of the precious metal with the dressed plates and the absorption of the values by the said plates.

With these and such other ends in view as pertain to the nature of the invention the latter consists of the novel features and the details of construction which hereinafter will be more particularly described, illustrated, and finally claimed.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a trap or ore separator for effecting the ends of this invention. Fig. 2 is a transverse section thereof about on the line X X of Fig. 1, looking in the direction of the arrow. Fig. 3 is a longitudinal section on the line Y Y of Fig. 1, viewed in the direction shown by the arrow. Figs. 4, 5, and 6 are detail views of the reticulated plates.

Corresponding and like parts are referred to in the following description and indicated in the several views of the drawings by the same reference-characters.

The trap 1 is box-shaped and is closed at its bottom and sides, and a flume 2 communicates with the lower portion thereof at or near one end for the ingress of the water or ore-bearing medium, and a flume 3 is disposed at or near the opposite end, near the top thereof, for the egress of the water after the ore has been separated therefrom. An opening 4 is provided in a side of the trap, near the bottom thereof, for the removal of the amalgam and other matter from the lower portion of the trap, and this opening is closed by a cap or plug 5, removably fitted thereto, so that access can be had to the bottom portion of the trap when required.

A plate 6 is placed upon the bottom of the trap and is dressed in the usual way with mercury, so as to absorb any particles of the precious metals which may be precipitated or otherwise come in contact therewith.

A bank or series of reticulated plates are located above the bottom of the trap and between horizontal planes passing through the ingress and egress flumes, and these plates 7, 8, and 9 are located at different elevations and have the openings therein of graduated size, that is, the openings 11 of the plate 8 are larger than the openings 12 of the plate 9 and are smaller than the openings 10 of the plate 7, and the openings in the several plates are disposed out of register, so that the water or ore-bearing medium will be deflected in its upward course through the trap, thereby bringing the values or precious particles into contact with the plates, so as to be absorbed by the dressing thereof.

The number of the reticulated plates may vary and will depend upon the capacity and character of work for which the trap is designed, but in every instance the openings thereof will be disposed in progressive order, the largest being at the bottom and the smallest at the top and will be set out of register. The several plates 6 7, &c., will be of copper coated or dressed with mercury, the bottom plate 6 being dressed on its top side only and the reticulated plates being dressed on both sides.

The tailings from the mill, placer-sluice, or other ore-treating device enter the trap by way of the flume 2 and pass upward through the series or bank of plates, which latter extract or remove all trace of the mineral or precious particles, and the water or medium bearing the ore prior to the separation escapes by way of the flume 3. The floating particles are separated by coming in contact with the lower side of the reticulated plates in the upward course of the water, and any particles precipitated will be absorbed by the dressing on the top side of the plates. Thus it will be seen that both sides of the plates are utilized for effectively separating the values or particles of mineral from the ore-bearing medium.

Having thus described the invention, what is claimed as new is—

Means constructed substantially as specified for separating and extracting floating particles of precious metals from their bearing medium, the same consisting of a box-shaped trap having an opening in a side near its bottom, means for closing said opening, an inlet-flume communicating with one side of the trap near an end and the bottom thereof, an outlet-flume communicating with the opposite side of the trap near the other end and top, a series of copper plates located within the trap at different levels and amalgamated or coated with mercury on their top and bottom sides, said plates having openings of graduated sizes, and the openings in the several plates being out of register, the openings in the bottom plate being the largest and the openings in the topmost plate the smallest, and a copper plate placed upon the bottom of the trap and coated on its top side with mercury, substantially as and for the purpose specified.

In testimony that I claim the foregoing as my own I have hereto affixed my signature in the presence of two witnesses.

JOHN O. ANDERSON.

Witnesses:
EDWARD GEORGE,
GEORGE G. ALLINSON.